(12) United States Patent
Ebihara

(10) Patent No.: US 10,740,623 B2
(45) Date of Patent: Aug. 11, 2020

(54) REPRESENTATIVE IMAGE GENERATION DEVICE AND REPRESENTATIVE IMAGE GENERATION METHOD

(71) Applicant: SONY CORPORATION, Tokyo (JP)

(72) Inventor: Masakazu Ebihara, Tokyo (JP)

(73) Assignee: SONY CORPORATION, Tokyo (JP)

(*) Notice: Subject to any disclaimer, the term of this patent is extended or adjusted under 35 U.S.C. 154(b) by 158 days.

(21) Appl. No.: 15/758,226

(22) PCT Filed: Aug. 18, 2016

(86) PCT No.: PCT/JP2016/003787
§ 371 (c)(1),
(2) Date: Mar. 7, 2018

(87) PCT Pub. No.: WO2017/051499
PCT Pub. Date: Mar. 30, 2017

(65) Prior Publication Data
US 2018/0260632 A1  Sep. 13, 2018

(30) Foreign Application Priority Data

Sep. 25, 2015 (JP) .................. 2015-188071
Jul. 14, 2016 (JP) .................. 2016-139778

(51) Int. Cl.
| | | |
|---|---|---|
| *G06K 9/00* | (2006.01) | |
| *G06T 7/20* | (2017.01) | |
| *G08B 13/196* | (2006.01) | |
| *G06T 7/00* | (2017.01) | |

(52) U.S. Cl.
CPC ...... *G06K 9/00771* (2013.01); *G06K 9/00369* (2013.01); *G06K 9/00744* (2013.01); *G06T 7/20* (2013.01); *G08B 13/1961* (2013.01); *G08B 13/19613* (2013.01); *G06T 2207/30196* (2013.01); *G06T 2207/30232* (2013.01)

(58) Field of Classification Search
CPC .............. G06T 7/00; G09G 3/00; G08B 13/00
USPC ......................................................... 382/103
See application file for complete search history.

(56) References Cited

U.S. PATENT DOCUMENTS

| | | | |
|---|---|---|---|
| 7,227,893 B1 | 6/2007 | Srinivasa et al. | |
| 8,044,992 B2* | 10/2011 | Kurebayashi | H04N 5/232 |
| | | | 348/211.8 |
| 2004/0027242 A1 | 2/2004 | Venetianer et al. | |
| 2009/0263021 A1 | 10/2009 | Takamori et al. | |
| 2014/0002505 A1* | 1/2014 | Yoshimi | G06F 3/03547 |
| | | | 345/660 |

FOREIGN PATENT DOCUMENTS

| | | |
|---|---|---|
| AT | 507543 T | 5/2011 |
| AU | 2002337829 A1 | 4/2003 |
| CA | 2460426 A1 | 4/2003 |

(Continued)

*Primary Examiner* — Abolfazl Tabatabai
(74) *Attorney, Agent, or Firm* — Chip Law Group

(57) ABSTRACT

A representative image generation device includes circuitry that identifies a selected image from a plurality of recorded images of an object. The plurality of recorded images are captured as the object traverses a predetermined area. The device prepares the selected image for display on a display device, wherein the selected image provides a visual recognizability of the object greater than a predetermined threshold.

21 Claims, 7 Drawing Sheets

(56) References Cited

FOREIGN PATENT DOCUMENTS

| | | | |
|---|---|---|---|
| CN | 1568487 | A | 1/2005 |
| DK | 1435170 | T3 | 8/2011 |
| EP | 1435170 | A2 | 7/2004 |
| EP | 2100453 | A1 | 9/2009 |
| ES | 2364915 | T3 | 9/2011 |
| HK | 1071956 | A1 | 5/2008 |
| JP | 2005-506740 | A | 3/2005 |
| JP | 2005-227957 | A | 8/2005 |
| KR | 2004-0050907 | A | 6/2004 |
| MX | PA04003441 | A | 2/2005 |
| WO | 03/032622 | A2 | 4/2003 |
| WO | 2008/075779 | A1 | 6/2008 |
| WO | 2012/141574 | A1 | 10/2012 |

\* cited by examiner

[Fig. 1]
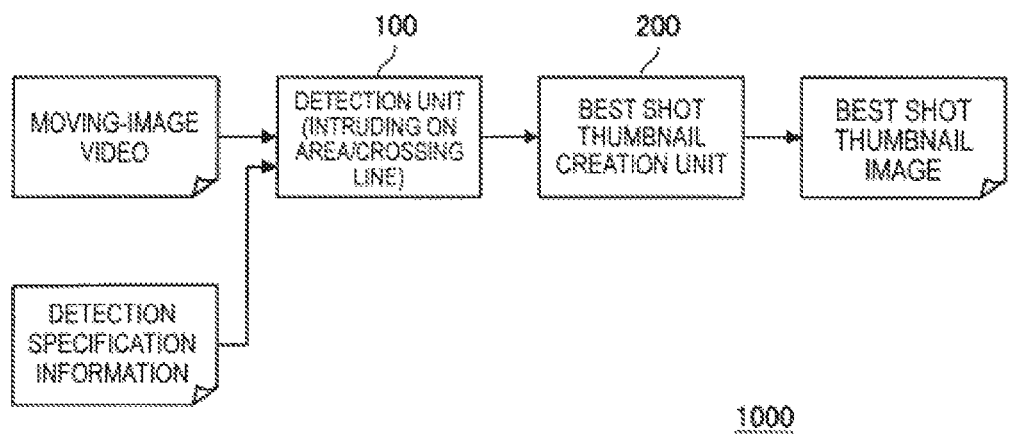

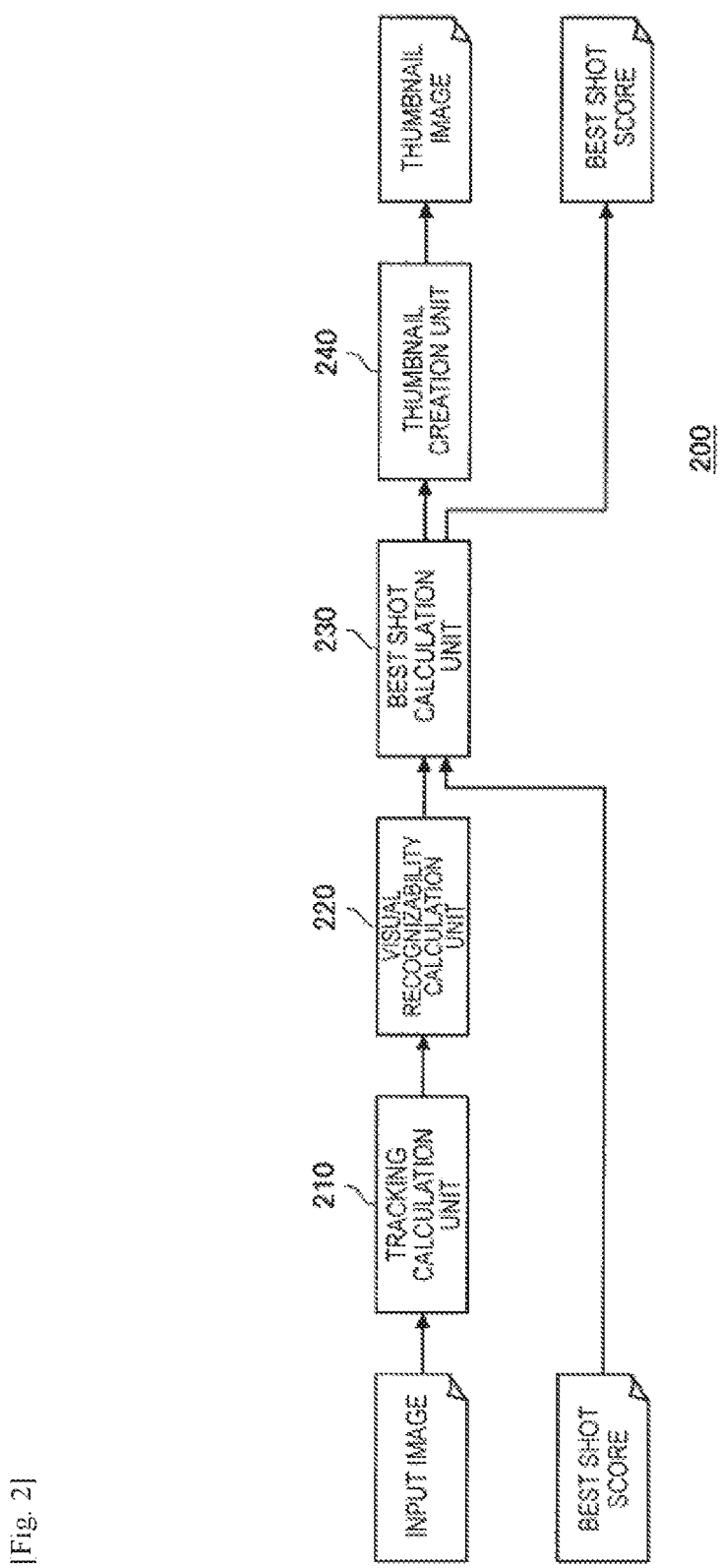
[Fig. 2]

[Fig. 3]
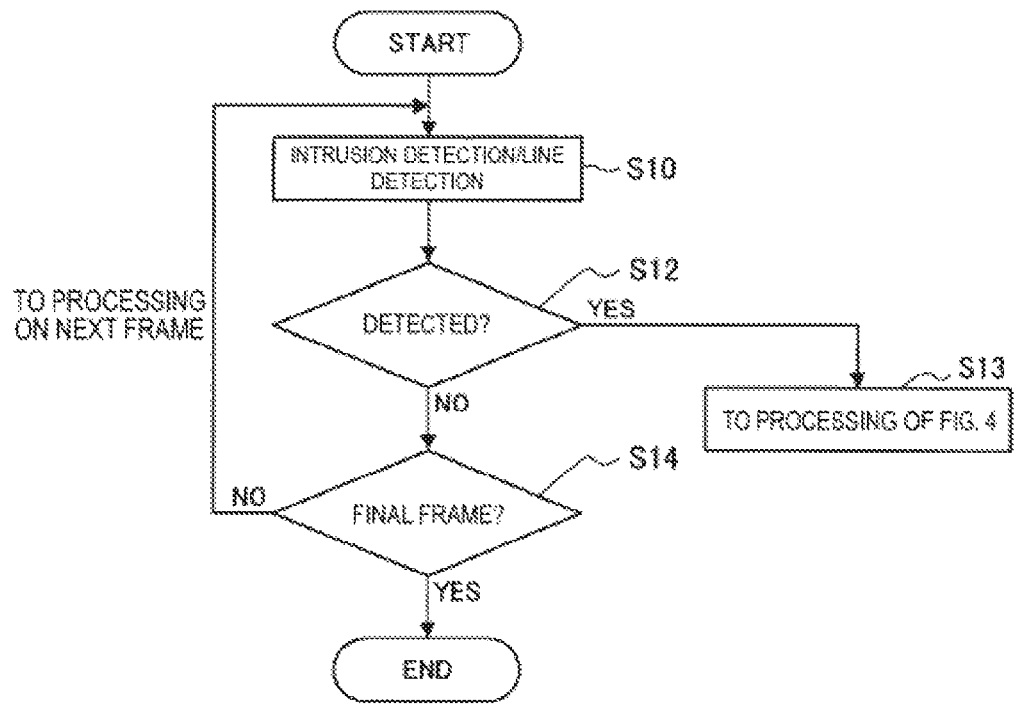

[Fig. 4]
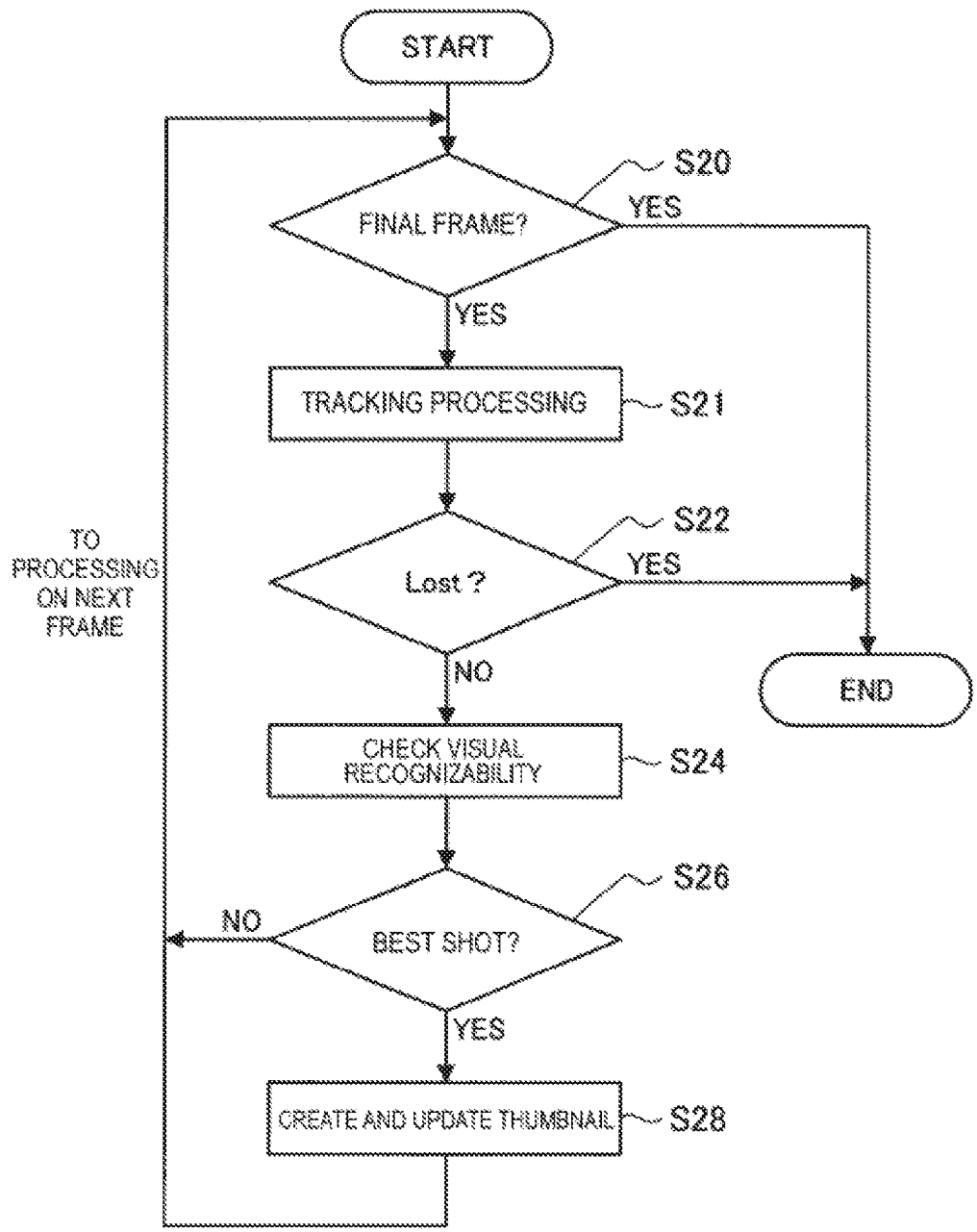

[Fig. 5]
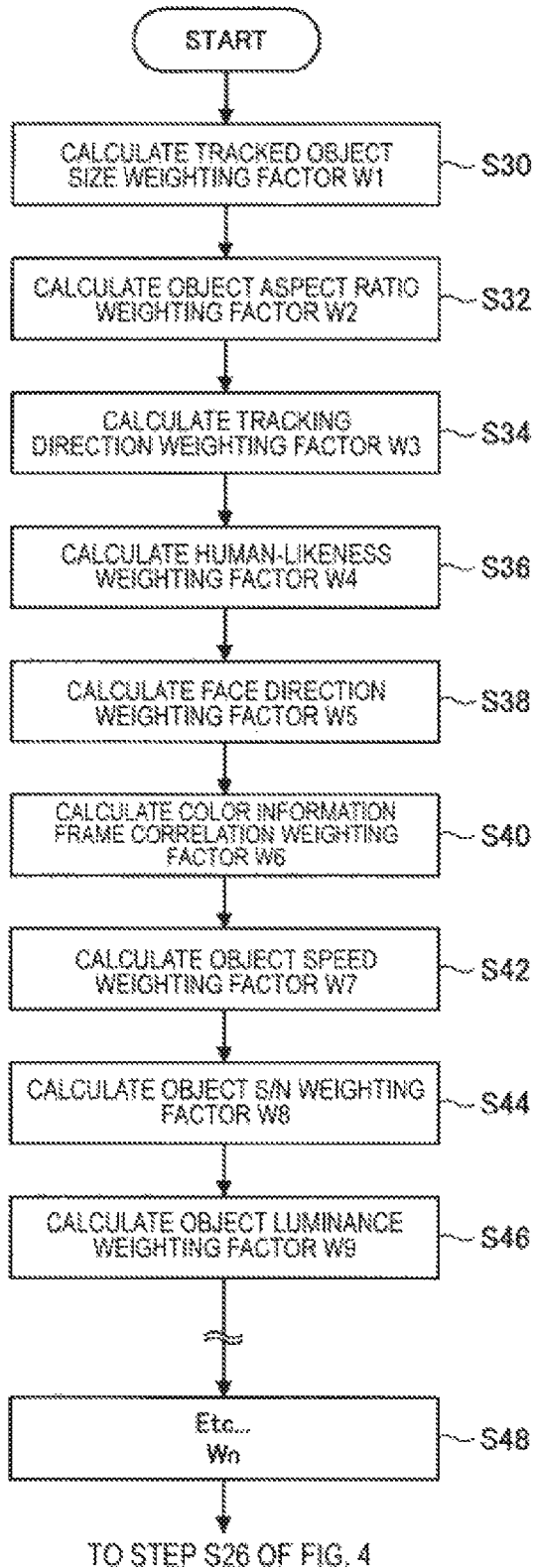

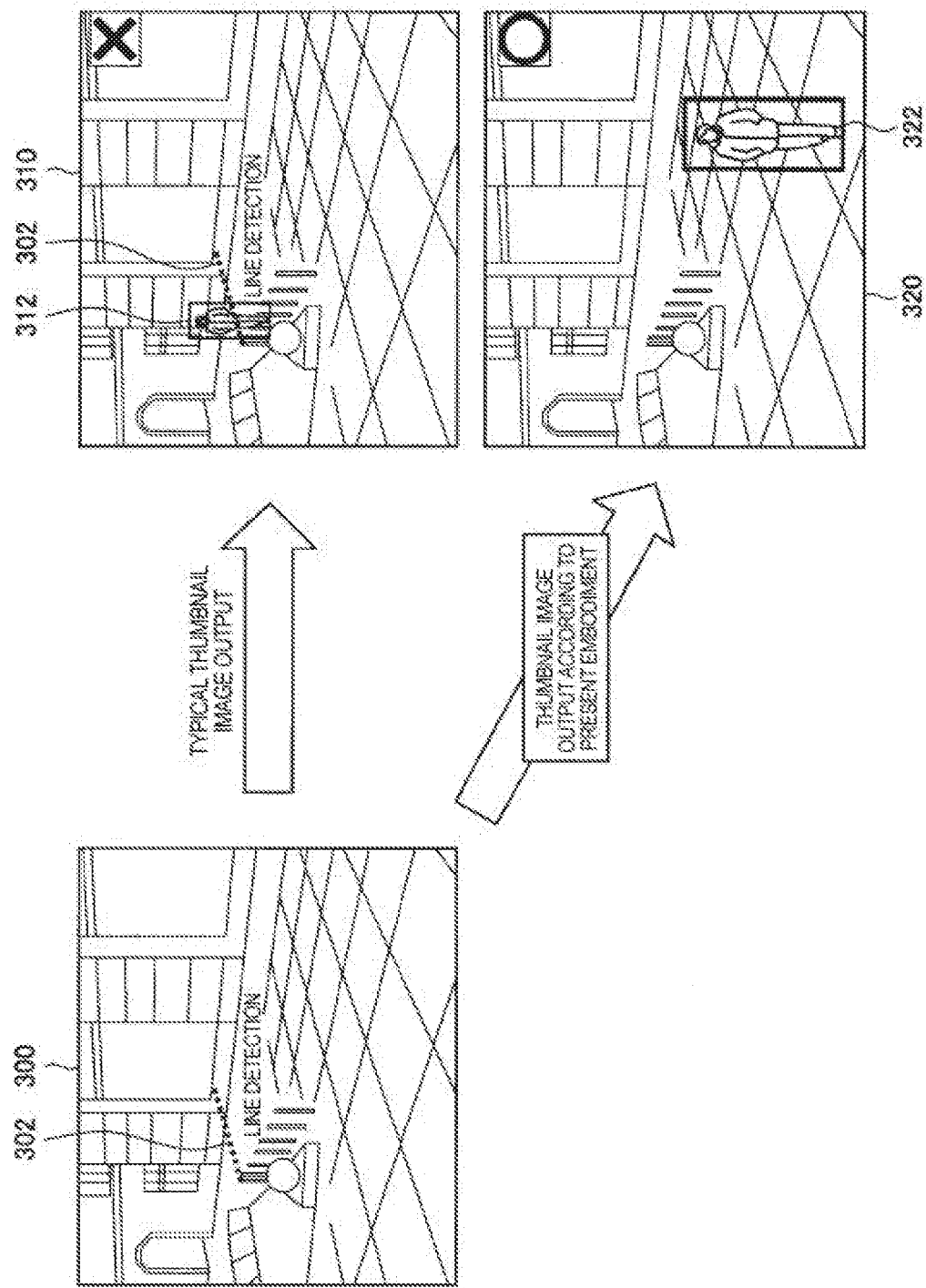

[Fig. 7]
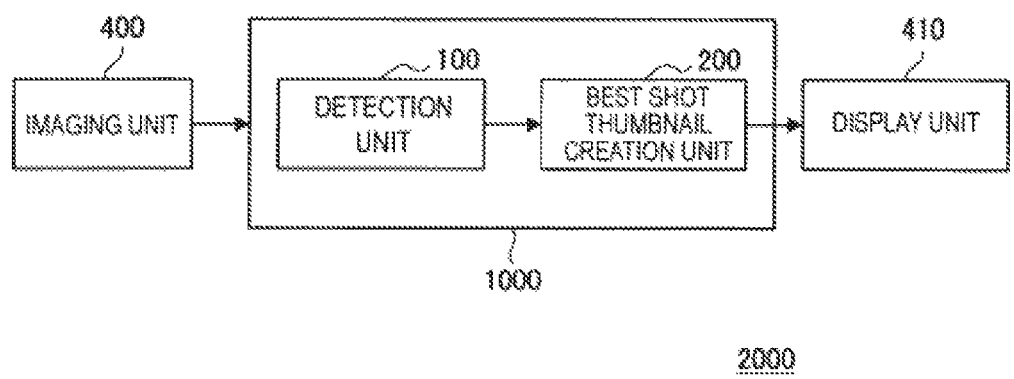

REPRESENTATIVE IMAGE GENERATION DEVICE AND REPRESENTATIVE IMAGE GENERATION METHOD

CROSS REFERENCE TO RELATED APPLICATIONS

This application is a U.S. National Phase of International Patent Application No. PCT/JP2016/003787 filed on Aug. 18, 2016, which claims priority benefit of Japanese Patent Application No. JP 2015-188071 filed in the Japan Patent Office on Sep. 25, 2015, and also claims priority benefit of Japanese Patent Application No. JP 2016-139778 filed in the Japan Patent Office on Jul. 14, 2016. Each of the above-referenced applications is hereby incorporated herein by reference in its entirety.

TECHNICAL FIELD

The present disclosure relates to a representative image generation device, a representative image generation method, and a program.

BACKGROUND ART

For example, PTL 1 describes as the related art that a device which detects face images selects and stores objectively the most balanced front face image from a series of sequential images.

CITATION LIST

Patent Literature

[PTL 1]
JP 2005-227957A

SUMMARY

Technical Problem

Recent years have seen an explosive increase in security cameras, and it is said that the recording time of video has already exceeded a trillion hours a year. This trend is going to accelerate, and the recording time is expected to be several times as long as the current recording time in a few years. In spite of these circumstances, however, operators visually search (i.e. reproduce and check) a vast amount of recorded video one by one in most cases even today, when some emergency like accidents occurs. This is unfortunately increasing the personnel costs of operators year by year.

A possible approach to this is to use a function of specifying a no-entry area or a pass line in advance to detect a person or a vehicle that has trespassed (intrusion detection) on the no-entry area or has crossed (line detection) the specified line. The use of these intrusion detecting functions makes it possible to reduce the search time, and if these intrusion detecting functions are implemented inside a surveillance camera or a server that records and manages the video, it is possible to reduce the workloads of operators.

However, if a detected person or vehicle is shown small in the image, or if a detected person or vehicle does not point in an appropriate direction in the image, it is difficult to discover the identity of the detected person or vehicle in spite of the use of the intrusion detecting functions.

The technology described in PTL 1 allows a device that detects face images to select and store objectively the most balanced front face image from a series of sequential images, but is not intended at all to acquire an image to certainly distinguish a target object on which a surveillance camera and the like conducts motion detection.

It is thus desired to generate the optimum representative image of a target object on which motion detection is conducted to reveal the target object.

Solution to Problem

In one embodiment, a representative image generation device, includes circuitry configured to
  identify a selected image from a plurality of recorded images that include at least a portion of an object, the plurality of recorded images being captured as the object traverses a predetermined area, and
  prepare the selected image for display on a display device, wherein
  the selected image provides a visual recognizability of the object greater than a predetermined threshold.

In another embodiment, a representative image generation system, includes
  a surveillance camera; and
  circuitry configured to
    identify a selected image from a plurality of recorded images that include at least a portion of an object captured by the surveillance camera, the plurality of recorded images being captured as the object traverses a predetermined area, and
    prepare the selected image for display on a display device, wherein
    the selected image provides a visual recognizability of the object greater than a predetermined threshold.

In another embodiment, a non-transitory computer-readable medium stores instructions that when executed by processing circuitry is configured to implement a method, the method including: identifying with the processing circuitry a selected image of a plurality of recorded images that include at least a portion of an object, the plurality of recorded images being captured as the object traverses a predetermined area, and
  preparing with the processing circuitry the selected image for display on a display device, wherein
  the selected image provides a visual recognizability of the object greater than a predetermined threshold.

Advantageous Effects of Invention

According to one or more embodiments of the present disclosure as described above, it is possible to generate the optimum representative image of a target object on which motion detection is conducted to reveal the target object.

Note that the effects described above are not necessarily limitative, and along with or instead of the above-described effects, any effect that is desired to be introduced in the present specification or other effects that can be expected from the present specification may be exhibited.

BRIEF DESCRIPTION OF DRAWINGS

FIG. 1 is a schematic diagram illustrating an example of a configuration of a representative image generation device according to the present embodiment.

FIG. 2 is a block diagram illustrating an appropriate-thumbnail creation unit in detail.

FIG. 3 is a flowchart illustrating detection phase processing of detecting a moving object from moving-image video.

FIG. 4 is a flowchart illustrating appropriate-image selection phase processing.

FIG. 5 is a flowchart specifically illustrating processing in step S24 of FIG. 4.

FIG. 6 is a schematic diagram illustrating an example of comparison of effects between a thumbnail image output by a typical technique and a thumbnail image output according to the present embodiment in a case where it is detected that a specified line is crossed.

FIG. 7 is a schematic diagram illustrating a configuration of a surveillance camera that includes the representative image generation device.

FIG. 8 is a schematic diagram illustrating that a line crossing setting screen, a line crossing scene check screen, and an appropriate-image check screen acquired by the representative image generation device are retroactively acquired.

DESCRIPTION OF EMBODIMENTS

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

A description will be made in the following order.

1. Prerequisite Technology
2. Example of Configuration of Representative Image Generation Device according to Present Embodiment
3. Processing Flow Performed by Representative Image Generation Device
4. Example of Comparison of Effects between Thumbnail Image Output by Typical Technique and Thumbnail Image Output according to Present Embodiment
5. Example of Configuration of Surveillance Camera 1. Prerequisite Technology In spite of a recent explosive increase in security cameras as discussed above, operators visually search (i.e. reproduce and check) a vast amount of recorded video one by one in most cases even today, when some emergency like accidents occurs. This is unfortunately increasing the personnel costs of operators year by year.

A possible approach to this is to use a function of specifying a no-entry area or a pass line in advance to detect a person or a vehicle that has trespassed (intrusion detection) on the no-entry area or has crossed (line detection) the specified line. The use of these intrusion detecting functions makes it possible to reduce the search time, and if these intrusion detecting functions are implemented inside a surveillance camera or a server that records and manages the video, it is possible to reduce the workloads of operators.

However, there are still problems in spite of the use of these functions, and it is not possible in some cases to reduce the work hours of operators. These problems will be described by using, as an example, a workflow for searching for a person (criminal) who has intruded on a no-entry area, in accordance with the flow shown by the following steps 1 to 4.

Step 1: An accident occurs in an area monitored by a surveillance camera

Step 2: An operator sets a given particular area to search, for which an intrusion detecting function has been set, in order to find out who has been in the particular area Step 3: The intrusion detecting function is started to search recorded video for a person who has intruded on the particular area Step 4: The operator visually checks target people one by one with reference to a group of search results (thumbnails and time line tags) output from the intrusion detecting function to identify the criminal The problematic phases in the above flow are steps 3 and 4. As a result of the intrusion detection, the video of a person at the time of intrusion on a no-entry area is typically output in the form of a thumbnail serving as a search result in the phase of step 3. In the phase of step 4, an operator visually checks the output thumbnail, thereby determining whether or not the person who has been searched for is a criminal. However, the thumbnail output in step 3 is cut out from the image showing the moment of intrusion, so that some specified position in the area causes the thumbnail to show a target person too small to secure enough resolution even if the thumbnail is enlarged. It is thus not possible to identify the characteristics of the face or clothing on the basis of the thumbnail alone. After all, the operator has to repeat a technique of reproducing images showing the target person one by one, and watching and visually checking the images until the operator can visually recognize the image of the person.

The video of a target person at the moment of detection of intrusion on a no-entry area is not output as a thumbnail, but the target person who has intruded is tracked and a person thumbnail is created from the video of the frame offering the best visual recognizability in the present embodiment. This makes it possible to greatly reduce the working hours of the operator. The detailed description will be made below.

2. Example of Configuration of Representative Image Generation Device According to Present Embodiment FIG. 1 is a schematic diagram illustrating an example of a configuration of a representative image generation device 1000 according to the present embodiment. The representative image generation device 1000 acquires moving-image video captured by a surveillance camera, and outputs a thumbnail image (representative image) of a tracking target object. As discussed below, the representative image generation device 1000 may be a different device such as a personal computer from the surveillance camera. Alternatively, the representative image generation device 1000 may be integrated with the surveillance camera. As illustrated in FIG. 1, the representative image generation device 1000 includes a detection unit 100, an appropriate-thumbnail creation unit 200, a storage unit 250, a display processing unit 260, and an operation input unit 270. Each frame of moving-image video captured by the camera is input into the detection unit 100. Detection specification information indicating the above-described no-entry area or specified line is also input into the detection unit 100.

Moving-image video captured by the surveillance camera is input into the detection unit 100. The detection unit 100 conducts motion detection on the input moving-image video by using a known technique, and detects, for example, a person or vehicle moving in the video. A description will be made in the present embodiment by using a system in which a person moving in the video is detected. Cars or any other targets may also be detected in addition to the person. The detection unit 100 also detects whether or not the person moving in the video has intruded on the no-entry area, or whether or not the person moving in the video has crossed the specified line, on the basis of the input detection specification information.

The appropriate-thumbnail creation unit 200 determines whether or not the video of the person subjected to motion detection in the input moving-image video is the image that is appropriate. If the appropriate-thumbnail creation unit 200 determines the video as the image that is appropriate, the appropriate-thumbnail creation unit 200 creates and outputs a thumbnail image. The storage unit 250 stores a variety of images including the created appropriate thumbnail image and an image showing a tracking target person crossing the specified line. The display processing unit 260 performs processing for displaying the variety of images including the appropriate thumbnail image. The operation input unit 270 receives operation information from a user interface such as a mouse, a keyboard, and a touch panel.

FIG. 2 is a block diagram illustrating the appropriate-thumbnail creation unit 200 in detail. Each structural element as illustrated in FIGS. 1 and 2 can be configured of hardware (circuit) or a central processing device such as a CPU, and software (program) for causing it to function. The appropriate-thumbnail creation unit 200 includes a tracking calculation unit 210, a visual recognizability calculation unit 220, a suitability calculation unit 230, and a thumbnail creation unit 240. The tracking calculation unit 210 has a function of tracking a person detected by the detection unit 100. The tracking calculation unit 210 tracks a person while determining on the basis of the characteristics of the person detected by the detection unit 100 whether or not the tracked persons in the respective frames are the same person.

The visual recognizability calculation unit 220 is a block for determining the visual recognizability of the person tracked by the tracking calculation unit 210 in each frame, and calculating a plurality of visual recognizability weighting factors to calculate the suitability score. The suitability calculation unit 230 calculates the suitability score on the basis of a result obtained by calculating the weighting factors, which is output from the visual recognizability calculation unit 220. The thumbnail creation unit 240 creates a thumbnail image of the tracked person.

3. Processing Flow Performed by Representative Image Generation Device

The following describes processing performed by the representative image generation device 1000 with reference to the block diagrams of FIGS. 1 and 2 on the basis of the flowcharts of FIGS. 3 and 4. FIG. 3 is a flowchart illustrating detection phase processing of detecting a moving object from moving-image video, and a moving object is detected in each frame of moving-image video. Detecting the intrusion on a no-entry area or detecting that a specified line is crossed serves as a trigger for determining whether or not the phase transitions to the appropriate-image selection phase of FIG. 4 in this processing. First, in step S10, motion detection is conducted, and it is detected whether or not the tracked person has intruded on a no-entry area, or whether or not the tracked person has crossed a specified line. Specifically, the detection unit 100 conducts motion detection on the input moving-image video, and detects for each frame whether or not a person has intruded on the no-entry area specified on the basis of the detection specification information, or whether or not a person has crossed the specified line specified on the basis of the detection specification information.

If, in step S12, a person who has intruded on the no-entry area or a person who has crossed the specified line is detected as a result of the detection in step S10, the processing proceeds to step S13 and the phase transitions to the processing of FIG. 4 to create the appropriate thumbnail. Conversely, if no person who has intruded on the no-entry area or no person who has crossed the specified line is detected, the processing proceeds to step S14 and it is determined whether or not the current frame is the final frame of the moving-image video for the search target period. If it is determined in step S14 that the current frame is not the final frame of the moving-image video, the processing returns to step S10 and the same processing is repeated on the next frame. Conversely, if it is determined in step S14 that the current frame is the final frame, the processing terminates (end).

The determination in step S14 considers that a moving image of moving-image video whose search target period ranges from 5 p.m. to 6 p.m. has the frame captured at 6 p.m. as the final frame. This eliminates processing of creating thumbnail images on frames captured after 6 p.m. In this way, if it is clear in advance that a tracking target person passes by a surveillance camera within a period of time between 5 p.m. and 6 p.m., limiting the search target period to the period of time between 5 p.m. and 6 p.m. makes it possible to reduce the processing of creating a thumbnail image.

Detecting whether or not the tracked person has intruded on the no-entry area or detecting whether or not the tracked person has crossed the specified line triggers a transition to the appropriate-image selection phase of FIG. 4 in the flowchart of FIG. 3, but detecting a tracking target object as a result of motion detection may also trigger a transition to the appropriate-image selection phase of FIG. 4.

FIG. 4 is a flowchart illustrating appropriate-image selection phase processing. The processing of FIG. 4 is also performed on each frame. The person detected by the detection unit 100 is tracked, visual recognizability scores are calculated for all the tracked frames, and it is determined whether or not the image of each frame is the appropriate image of the tracked person. If it is determined that the image of each frame is the appropriate image, a thumbnail image is output.

Next, in step S21, it is first determined whether or not the current frame is the final frame, and if it is not determined that the current frame is the final frame, the processing proceeds to step S21. In step S21, the tracking calculation unit 210 tracks the person on whom the detection unit 100 has conducted motion detection. Specifically, the person tracked until the last frame is searched for in the current frame, and once the tracked person is found out, the tracking frame of the outline of the person is calculated and set.

Next, in step S22, the tracking calculation unit 210 determines as a result of tracking in step S20 whether or not the tacking target person disappears (is lost) from the frame. If tracking results in failure and the tracking target person disappears from the frame, the appropriate-image selection phase terminates and the phase transitions to the detection phase of FIG. 3 again. If the tracking target person is present in the frame and tracking results in success, the processing proceeds to the visual recognizability check processing in step S24.

In step S24, the visual recognizability calculation unit 220 checks the visual recognizability from a plurality of viewpoints to calculate the suitability score. A plurality of weighting factors are computed in this visual recognizability check. FIG. 5 is a flowchart specifically illustrating the processing in step S24 of FIG. 4.

In step 30 of FIG. 5, a weighting factor (tracked object size weighting factor) W1 is calculated on the basis of the size of the tracked object (person). As the tracked person is bigger, the visual recognizability is better. Accordingly, the weighting factor W1 has a larger value. For example, as the tracked person comes closer to a surveillance camera, the person increases in size. Accordingly, the weighting factor W1 has a larger value. In other words, the large value of the weighting factor W1 means that an image of a target person is larger.

Next, in step S32, a weighting factor (object aspect ratio weighting factor) W2 is calculated on the basis of the aspect ratio of the tracked person. If the aspect ratio of the tracked person is close to the typical aspect ratio of a human (e.g. value of about 1:4), there is a strong likelihood of a human and then the weighting factor W2 has a larger value. In other words, the large value of the weighting factor W2 means that the aspect ratio of a target person is closer to the typical aspect ratio of a human. Next, in step S34, a weighting factor (tracking direction weighting factor) W3 is calculated in accordance with whether or not the direction of the tracked person points to the front of the surveillance camera. If the direction of the tracked person points to the front of the surveillance camera, or the person is, for example, walking in the direction of the front of the surveillance camera, the visual recognizability of the face of the person grows better and then the weighting factor W3 has a larger value. In other words, the large value of the weighting factor W3 means that a target person is walking in a direction closer to the front of a surveillance camera. The direction of the tracked person can be obtained on the basis of a differential vector (motion vector) obtained between the positions of the tracked person over frames.

Next, in step S36, a weighting factor (human-likeness weighting factor) W4 is calculated in accordance with whether or not the tracked object has the shape of a human. The shape of the tracked object obtained through image edge detection or the like is here compared with dictionary data (human shape template) prepared in advance, and it is determined whether or not the tracked object has the shape of a human. As the tracked object has a more similar shape to the shape of a human, the weighting factor W4 has a larger value. In other words, the large value of the weighting factor W4 means that a tracked object has a more similar shape to the shape of a human.

Next, in step S38, a weighting factor (face direction weighting factor) W5 according to whether or not the direction of the face points in the direction of the camera is calculated. Specifically, the direction of a face is determined by detecting the face from the image of a frame on the basis of the typical face detection, and then comparing the detected face with the template according to the direction of the face, which is prepared in advance. As the direction of the face points in a direction closer to the front of the camera, the weighting factor W5 has a larger value. In other words, the large value of the weighting factor W5 means that the direction of a face points in a direction closer to the front of a camera more.

Next, in step S40, a weighting factor (color information frame correlation weighting factor) W6 is calculated that indicates whether or not a change in the tracked color is stable, in accordance with the correlation of color information on a frame with color information on another frame. When the tracked color drastically changes as compared with the previous frames and the continuousness of the color is lowered (e.g. when the tracked person moves from a sunny area to a shady area, or when a vehicle shines lights on the tracked person), the visual recognizability of a face is lowered. Accordingly, the weighting factor W6 has a smaller value. It is determined on the basis of the color information whether or not the frame includes a single person or a plurality of people. If the frame includes a single person, the frame offers the better visual recognizability of the face than a frame including a plurality of people does, and the weighting factor W6 thus has a larger value. In other words, the large value of the weighting factor W6 means that the visual recognizability of a face is higher.

Next, in step S42, a weighting factor (object speed weighting factor) W7 according to the speed of the tracked person is calculated. The visual recognizability of the tracked person is better when the tracked person moves at low speed than when the tracked person moves at high speed. Accordingly, as the tracked person moves (e.g. walks) at lower speed, the weighting factor W7 has a larger value. Since the shutter speed is slower especially in the nighttime, the image of a person moving at high speed tends to be blurred or fuzzy. In such a case, the weighting factor W7 has a smaller value. In other words, the large value of the weighting factor W7 means that a tracked person is moving at lower speed.

Next, in step S44, a weighting factor (object S/N weighting factor) W8 according to the noise level of the tracked object is calculated. Here, the noise (S/N ratio) is detected from the image of a frame, and lower noise causes the weighting factor W8 to have a larger value. For example, the noise is lower when the tracked person is in a bright place, so that the weighting factor W8 has a larger value. In other words, the large value of the weighting factor W8 means that the noise of an image is lower.

Next, in step S46, a weighting factor (object luminance weighting factor) W7 according to the luminance value of the tracked person is calculated. For example, it is more difficult to distinguish the face of the tracked person as the luminance value is smaller. Accordingly, the weighting value W9 has a smaller value. In addition, it is difficult to distinguish the face of the tracked person when the luminance value is too high and saturated. Accordingly, the weighting value W9 has a smaller value. In other words, when video has blocked-up shadows or blown-out highlights, the weighting factor W9 has a smaller value. In other words, the large of the weighting factor W9 means that it is easier to distinguish a face. Additionally, the processing shown in steps S30 to S46 is merely illustrative. If there is any other processing of determining visual recognizability, a weighting factor Wn according to the processing may also be added (step S48).

According to the processing of FIG. 5, as the visual recognizability of a tracking target person subjected to motion detection is higher, the weighting factors W1 to W9 each have a larger value. Additionally, the processing in steps S30 to S46 is performed on the image within a tacking frame set for a tracking target subjected to motion detection, but may also be performed on the whole image of the frame.

Once the visual recognizability is checked in step S24 of FIG. 4 as described above, the processing proceeds to step S26 next. In step S26, the suitability calculation unit 230 uses all the elements of the weighting factors W1 to W9 obtained in the respective steps of FIG. 5 to calculate the suitability score of the current frame. The suitability calculation unit 230 then compares the calculated suitability score with the maximum value of the suitability scores of the previous frames, and determines the current frame as the appropriate image if the score value of the current frame is larger. In other words, an image offering high visual recognizability or an image determined to be appropriate is determined as an appropriate image on the basis that, for example, an image of a target person is large, an aspect ratio is close to the typical aspect ratio of a human, the direction of a target person points to the front of a surveillance camera, a tracked object has a shape similar to the shape of a human, the direction of a face points to the front of a camera, the visual recognizability of a face is high, a tracked person moves at low speed, the noise of an image is low, and it is easy to distinguish a face.

Specifically, the suitability calculation unit 230 compares the sum of the weighting factors W1 to W9 obtained in the respective steps of FIG. 5 for the current frame with the maximum value of the sums of the weighting factors W1 to W9 calculated for the previous frames, and determines the current frame as the appropriate image if the sum of the weighting factors W1 to W9 for the current frame is greater than the maximum value of the sums of the weighting factors W1 to W9 calculated for the previous frames, and then the processing proceeds to step S28.

In step S28, the thumbnail creation unit 240 creates a thumbnail image of the tracked person from the image of the current frame. The thumbnail creation unit 240 uses a tracking frame calculated by the tracking calculation unit 210 to create a thumbnail image. The thumbnail creation unit 240 uses the thumbnail image to replace the thumbnail image (thumbnail candidate image) created from the previous frame, thereby updating the thumbnail image. Following step S28, the processing returns to step S20 for processing the next frame.

Conversely, if the current frame is not determined as the appropriate image in step S26, no thumbnail image is created, but the processing returns to step S20 for processing the next frame.

Even if it is determined in step S26 that the score of the current frame does not reach the maximum value of the suitability scores of the previous frames, the processing may proceed to step S28 for thumbnail image creation processing as long as the suitability score of the current frame exceeds a predetermined threshold set in advance.

As described above, repeating the processing of FIGS. 3 and 4 makes it possible to replace a thumbnail image with an image offering the best visual recognizability. As an image corresponding to a target person at the time when an event is detected, it is possible to replace a thumbnail image with an image that is appropriate, on the basis of the visual recognizability of an image at different time from the detection time and even the visual recognizability of the image of a different frame.

Although a thumbnail image is created and updated every time the maximum value of the suitability scores is updated in the above-described example, the suitability score values of the respective frames may be calculated without creating any thumbnail images until the final frame, and then a thumbnail image may be created from the frame for which the maximum value is recorded after the score value of the final frame is calculated.

4. Example of Comparison of Effects Between Thumbnail Image Output by Typical Technique and Thumbnail Image Output According to Present Embodiment FIG. 6 is a schematic diagram illustrating an example of comparison of effects between a thumbnail image output by a typical technique and a thumbnail image output according to the present embodiment in a case where it is detected that a specified line is crossed. FIG. 6 illustrates an image 300 with a specified line 302 as shown as a dashed line set in the moving-image video frame. If the specified line 302 is set, an alert is issued once it is detected that a person has crossed the specified line 302. The typical technique cuts out an area surrounded by a tracking frame 312 in the image 310 and outputs a thumbnail image at the time when a person crosses the specified line 302 as shown in the image 310. In this case, the thumbnail image at the time when the person crosses the specified line 302 shows the person in the distance, so that the face is too small to identify the person from the face.

Meanwhile, according to the present embodiment, a person crossing the specified line 302 serves as a trigger for beginning to track the target object. The suitability score is calculated for each frame, and a thumbnail image is output from the frame having the highest score. As a result, an area surrounded by a tracking frame 322 is cut out and a thumbnail image is output as shown in an image 320. According, as a thumbnail image, a scene is selected and output which offers good visual recognizability and shows the whole body of the person large who points to the front of the surveillance camera. Accordingly, when a person is observed, it is possible to output a thumbnail image of a scene proper for observation and in the best condition.

5. Example of Configuration of Surveillance Camera

FIG. 7 is a schematic diagram illustrating the configuration of a surveillance camera 2000 that includes the representative image generation device 1000. The surveillance camera 2000 includes an imaging unit 400, the representative image generation device 1000, and a display unit 410. The imaging unit 400 includes an image sensor such as a CMOS sensor, and an optical system that forms an image of a subject on the imaging plane of the image sensor. Image data (moving-image video) obtained by the image sensor conducting photoelectric conversion is input to the detection unit 100 of the representative image generation device 1000. The surveillance camera (also referred to as network camera) can connect to a network, and transmit an image via the network.

The display unit 410 includes, for example, a liquid crystal display, and displays a thumbnail image created by the appropriate-thumbnail creation unit 200 of the representative image generation device 1000. The display unit 410 may be provided to a management device (different from the surveillance camera) that manages the surveillance camera 2000, and in that case, a thumbnail image is transmitted to the management device and then displayed on the display unit 410 of the management device. The appropriate-thumbnail creation unit 200 may be provided to a management device (different from the surveillance camera) that manages the surveillance camera 2000. In that case, the camera transmits an image to the management device (case A), or the camera transmits a detection result to the management device (case B). In the case A, the management device performs detection processing, appropriate-thumbnail selection processing, and the like. In the case B, the management device performs appropriate-thumbnail selection processing and the like.

FIG. 8 is a schematic diagram illustrating that a line crossing setting screen, a line crossing scene check screen, and an appropriate-image check screen acquired by the representative image generation device 1000 are retroactively acquired. As discussed above, the representative image generation device 1000 includes the storage unit 250, the display processing unit 260, and the operation input unit 270. The representative image generation device 1000 stores an acquired appropriate thumbnail image in the storage unit 250. The representative image generation device 1000 also stores a line crossing setting screen, a line crossing scene check screen, an appropriate-image check screen in the storage unit 250 for a person who has created the appropriate thumbnail image. As illustrated in FIG. 8, the display processing unit 260 performs processing for displaying a list of appropriate thumbnail images, the line crossing setting screen, the line crossing scene check screen, and the appropriate-image check screen.

The line crossing setting screen displays, for each appropriate thumbnail image, a specified line based on the detection specification information. Additionally, a user can freely change the position of a specified line by operating the operation input unit 270, and the detection specification information is changed in accordance with a change in a specified line. The line crossing scene check screen displays a scene at which a tracked person crosses a specified line in step S10 of FIG. 3. The appropriate-image check screen displays a whole image at the time when an appropriate thumbnail image is acquired. Alternatively, the appropriate-image check screen may display not the whole image, but a part of an image such as an appropriate thumbnail image. The line crossing setting screen, the line crossing scene check screen, and the appropriate-image check screen corresponding to each appropriate thumbnail image are stored in the storage unit 250 in association with each appropriate thumbnail image.

A user can specify a particular appropriate thumbnail image from a list of appropriate thumbnail images by inputting operation information through the operation input unit 270. Specifically, a user can input operation information into the operation input unit 270, and specify a particular appropriate thumbnail image, for example, by operating a mouse to click the particular appropriate thumbnail image. Once a user specifies a particular appropriate thumbnail image, the line crossing setting screen, the line crossing scene check screen, and the appropriate-image check screen corresponding to the specified appropriate thumbnail image are displayed as illustrated in FIG. 8. This allows the user to check both an image at the time when a tracked person crosses a specified line, and an image at the time when the appropriate thumbnail image is generated. In addition, the user can check the position of the specified line on the line crossing setting screen.

According to the present embodiment, a thumbnail image is not cut out and output from video of the moment (e.g. intrusion detection) when a certain trigger is enabled, but a target object is tracked in each frame since the trigger has been enabled, the score is computed for each of the tracked frames, and a thumbnail image of the tracked object is created from the image of the frame having the best score. It is thus possible to output the thumbnail image offering the best visual recognizability, and to certainly identify a person or the like from the thumbnail image. Although an example of intrusion detection serving as a trigger has been described, intrusion detection does not necessarily have to serve as a trigger. For example, detecting an event such as detecting an object satisfying a predetermined condition may also serve as a trigger. Alternatively, for example, the input of a predetermined signal from an external sensor such as an infrared sensor may serve as a trigger.

It should be understood by those skilled in the art that various modifications, combinations, sub-combinations and alterations may occur depending on design requirements and other factors insofar as they are within the scope of the appended claims or the equivalents thereof.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1) In a first embodiment, a representative image generation device, comprising: circuitry configured to
identify a selected image from a plurality of recorded images that include at least a portion of an object, the plurality of recorded images being captured as the object traverses a predetermined area, and
prepare the selected image for display on a display device, wherein
the selected image provides a visual recognizability of the object greater than a predetermined threshold.

(2) The representative image generation device of (1), wherein
the predetermined threshold corresponds with a highest recognizability of the object out of the plurality of recorded images.

(3) The representative image generation device of (1), wherein
the predetermined threshold corresponds with a visual recognizability of the object that is greater than a visual recognizability of the object when initially detected as being in the predetermined area.

(4) The representative image generation device of (1), further comprising:
a display configured to display a representation of the selected image.

(5) The representative image generation device of (1), wherein the circuity is further configured to produce a tracking frame that includes at least a portion of the object therein.

(6) The representative image generation device of (1), wherein the selected image is a thumbnail image.

(7) The representative image generation device of (1), wherein the circuitry is configured to track the object as the object traverses the predetermined area.

(8) The representative image generation device of (1), wherein the circuitry is configured to use a size of the object in at least two of the plurality of recorded images of the object as a factor in identifying whether the selected image has a greater visual recognizability than the predetermined threshold.

(9) The representative image generation device of (1), wherein the circuitry is configured to use object aspect ratio of the object in at least two of the plurality of recorded images of the object as a factor in identifying whether the selected image has a greater visual recognizability than the predetermined threshold.

(10) The representative image generation device of (1), wherein the circuitry is configured to use direction of motion of the object in at least two of the plurality of recorded images of the object as a factor in identifying whether the selected image has a greater visual recognizability than the predetermined threshold.

(11) The representative image generation device of (1), wherein the circuitry is configured to use a calculated human likeness indication of the object in at least two of the plurality of recorded images of the object as a factor in identifying whether the selected image has a greater visual recognizability than the predetermined threshold.

(12) The representative image generation device of (1), wherein the circuitry is configured to use face direction of the object in at least two of the plurality of recorded images of the object as a factor in identifying whether the selected image has a greater visual recognizability than the predetermined threshold.

(13) The representative image generation device of (1), wherein the circuitry is configured to use color information frame correlation in at least two of the plurality of recorded images of the object as a factor in identifying whether the selected image has a greater visual recognizability than the predetermined threshold.

(14) The representative image generation device of (1), wherein the circuitry is configured to use object speed of the object in at least two of the plurality of recorded images of the object as a factor in identifying whether the selected image has a greater visual recognizability than the predetermined threshold.

(15) The representative image generation device of (1), wherein the circuitry is configured to use object signal to noise ratio of the object in at least two of the plurality of recorded images of the object as a factor in identifying whether the selected image has a greater visual recognizability than the predetermined threshold.

(16) The representative image generation device of (1), wherein the circuitry is configured to use object luminance in at least two of the plurality of recorded images of the object as a factor in identifying whether the selected image has a greater visual recognizability than the predetermined threshold.

(17) The representative image generation device of (1), wherein the plurality of recorded images are respective frames of a video, and the circuitry is further configured to produce a thumbnail image from the selected image.

(18) The representative image generation device of (1), wherein the circuitry is further configured to detect the object when the object enters the predetermined area.

(19) A representative image generation system, comprising:
 a surveillance camera; and
 circuitry configured to
 identify a selected image from a plurality of recorded images that include at least a portion of an object captured by the surveillance camera, the plurality of recorded images being captured as the object traverses a predetermined area, and
 prepare the selected image for display on a display device, wherein
 the selected image provides a visual recognizability of the object greater than a predetermined threshold.

(20) A non-transitory computer-readable medium that stores instructions that when executed by processing circuitry is configured to implement a method, the method comprising:
 identifying with the processing circuitry a selected image of a plurality of recorded images that include at least a portion of an object, the plurality of recorded images being captured as the object traverses a predetermined area, and
 preparing with the processing circuitry the selected image for display on a display device, wherein
 the selected image provides a visual recognizability of the object greater than a predetermined threshold.

(21)
 A representative image generation device including:
 a detection unit configured to acquire moving-image video, and to detect a target object from the moving-image video on the basis of motion detection;
 a tracking unit configured to track, after the detection unit detects the target object, the target object moving in the moving-image video; and
 a representative image creation unit configured to create, after the detection unit detects the target object, a representative image showing the target object tracked by the tracking unit.

(22)
 The representative image generation device according to (1), further including:
 a visual recognizability calculation unit configured to calculate visual recognizability of the target object while the tracking unit is tracking the target object,
 wherein the representative image creation unit creates the representative image on the basis of a result obtained by the visual recognizability calculation unit calculating the visual recognizability of the target object.

(23)
 The representative image generation device according to (2),
 wherein the visual recognizability calculation unit calculates the visual recognizability of the target object in each frame of the moving-image video, and
 wherein the representative image creation unit creates the representative image from an image of a frame offering highest visual recognizability of the target object.

(24)
 The representative image generation device according to (2) or (3),
 wherein the visual recognizability calculation unit calculates the visual recognizability of the target object in each frame of the moving-image video, and
 wherein the representative image creation unit creates the representative image from an image of a frame offering visual recognizability of the target object which is higher than or equal to a predetermined threshold.

(25)
 The representative image generation device according to any one of (2) to (4),
 wherein the visual recognizability calculation unit calculates a weighting factor for each of a plurality of factors that indicates the visual recognizability of the target object in each frame of the moving-image video,
 wherein the representative image generation device further includes a best shot calculation unit configured to calculate, on the basis of the weighting factor, a score of an image of a frame offering high visual recognizability of the target object, and
 wherein the representative image creation unit creates the representative image from the image of the frame offering the high visual recognizability of the target object on the basis of a calculation result of the best shot calculation unit.

(26)
 The representative image generation device according to (5),
 wherein the weighting factor has a larger value as the visual recognizability of the target object is higher, and
 wherein the representative image creation unit creates the representative image from an image of a frame having a greatest sum of the weighting factors.

(27)

The representative image generation device according to (5), wherein the weighting factor has a larger value as the visual recognizability of the target object is higher, and wherein the representative image creation unit creates the representative image from an image of a frame having a sum of the weighting factors which is greater than or equal to a predetermined threshold.

(28)

The representative image generation device according to (6), wherein, when a sum of the weighting factors for a current frame is greater than a sum of the weighting factors for a previous frame, the representative image creation unit creates the representative image and updates the representative image created from the previous frame.

(29)

The representative image generation device according to any one of (5) to (8), wherein the target object is a person, and wherein the plurality of factors include any of a size of the person, an aspect ratio of the person, a tracking direction of the person, human-likeness of the person, a direction of a face of the person, color information on the person, moving speed of the person, noise included in an image of the person, and luminance of the person.

(30)

The representative image generation device according to any one of (1) to (9), wherein the detection unit detects, from the moving-image video, the target object that satisfies a predetermined condition, and wherein the predetermined condition is that the target object has intruded on a predetermined no-entry area, or that the target object has crossed a predetermined specified line.

(31)

A representative image generation method including:

acquiring moving-image video, and detecting a target object from the moving-image video on the basis of motion detection;

tracking, after the target object is detected, the target object moving in the moving-image video; and creating, after the target object is detected, a representative image showing the tracked target object.

(32)

A program for causing a computer to function as:

a unit configured to acquire moving-image video, and to detect a target object from the moving-image video on the basis of motion detection;

a unit configured to track, after the target object is detected, the target object moving in the moving-image video; and a unit configured to create, after the target object is detected, a representative image showing the tracked target object.

REFERENCE SIGNS LIST

100 detection unit
210 tracking calculation unit
220 visual recognizability calculation unit
230 suitability calculation unit
250 storage unit
260 display processing unit
240 thumbnail creation unit
1000 representative image generation device

The invention claimed is:

1. A representative image generation device, comprising:
circuitry configured to:
identify a selected image of an object from a plurality of recorded images, wherein the plurality of recorded images includes at least a portion of the object, and the plurality of recorded images is captured as the object traverses a determined area; and
control display of the selected image on a display device, wherein the selected image provides a visual recognizability of the object greater than a determined threshold.

2. The representative image generation device of claim 1, wherein the determined threshold corresponds to a highest recognizability of the object among the plurality of recorded images.

3. The representative image generation device of claim 1, wherein the determined threshold corresponds to the visual recognizability of the object that is greater than a visual recognizability of the object at a time the object is initially detected in the determined area.

4. The representative image generation device of claim 1, further comprising the display device configured to display a representation of the selected image.

5. The representative image generation device of claim 1, wherein the circuitry is further configured to produce a tracking frame that includes the portion of the object.

6. The representative image generation device of claim 1, wherein the selected image is a thumbnail image.

7. The representative image generation device of claim 1, wherein the circuitry is further configured to track the object as the object traverses the determined area.

8. The representative image generation device of claim 1, wherein the circuitry is further configured to use a size of the object in at least two of the plurality of recorded images of the object as a factor to identify the selected image that has the visual recognizability greater than the determined threshold.

9. The representative image generation device of claim 1, wherein the circuitry is further configured to use object aspect ratio of the object in at least two of the plurality of recorded images of the object as a factor to identify the selected image that has the visual recognizability greater than the determined threshold.

10. The representative image generation device of claim 1, wherein the circuitry is further configured to use direction of motion of the object in at least two of the plurality of recorded images of the object as a factor to identify the selected image that has the visual recognizability greater than the determined threshold.

11. The representative image generation device of claim 1, wherein the circuitry is further configured to use a calculated human likeness indication of the object in at least two of the plurality of recorded images of the object as a factor to identify the selected image that has the visual recognizability greater than the determined threshold.

12. The representative image generation device of claim 1, wherein the circuitry is further configured to use face direction of the object in at least two of the plurality of recorded images of the object as a factor to identify the selected image that has the visual recognizability greater than the determined threshold.

13. The representative image generation device of claim 1, wherein the circuitry is further configured to use color information frame correlation in at least two of the plurality of recorded images of the object as a factor to identify the selected image that has the visual recognizability greater than the determined threshold.

14. The representative image generation device of claim 1, wherein the circuitry is further configured to use object speed of the object in at least two of the plurality of recorded images of the object as a factor to identify the selected image that has the visual recognizability greater than the determined threshold.

15. The representative image generation device of claim 1, wherein the circuitry is further configured to use object signal to noise ratio of the object in at least two of the plurality of recorded images of the object as a factor to identify the selected image that has the visual recognizability greater than the determined threshold.

16. The representative image generation device of claim 1, wherein the circuitry is further configured to use object luminance in at least two of the plurality of recorded images of the object as a factor to identify the selected image that has the visual recognizability greater than the determined threshold.

17. The representative image generation device of claim 1, wherein
the plurality of recorded images is respective frames of a video, and
the circuitry is further configured to produce a thumbnail image from the selected image.

18. The representative image generation device of claim 1, wherein the circuitry is further configured to detect the object at a time the object enters the determined area.

19. A representative image generation system, comprising:
a surveillance camera; and
circuitry configured to:
identify a selected image of an object from a plurality of recorded images, wherein the plurality of recorded images includes at least a portion of the object captured by the surveillance camera, and the plurality of recorded images is captured as the object traverses a determined area; and
control display of the selected image on a display device, wherein the selected image provides a visual recognizability of the object greater than a determined threshold.

20. A non-transitory computer-readable medium having stored thereon, computer executable instructions, which when executed by circuitry, cause the circuitry to execute operations, the operations comprising:
identifying a selected image of an object from a plurality of recorded images, wherein the plurality of recorded images includes at least a portion of the object, and the plurality of recorded images are captured as the object traverses a determined area; and
controlling display of the selected image on a display device, wherein the selected image provides a visual recognizability of the object greater than a determined threshold.

21. A representative image generation device, comprising: circuitry configured to:
identify a selected image from a plurality of recorded images, wherein the plurality of recorded images includes at least a portion of an object, and the plurality of recorded images is captured as the object traverses a determined area; and
control display of the selected image on a display device, wherein
the selected image provides a visual recognizability of the object greater than a determined threshold, and
the determined threshold corresponds to the visual recognizability of the object that is greater than a visual recognizability of the object when initially detected in the determined area.

* * * * *